US011292975B2

(12) United States Patent
Urakata et al.

(10) Patent No.: US 11,292,975 B2
(45) Date of Patent: Apr. 5, 2022

(54) POWDER FUEL SUPPLY APPARATUS, GASFIER UNIT, INTEGRATED GASIFICATION COMBINED CYCLE, AND CONTROL METHOD OF POWDER FUEL SUPPLY APPARATUS

(71) Applicant: MITSUBISHI HITACHI POWER SYSTEMS, LTD., Yokohama (JP)

(72) Inventors: Yuichiro Urakata, Kanagawa (JP); Koji Nishimura, Kanagawa (JP); Jun Kasai, Kanagawa (JP)

(73) Assignee: MITSUBISHI POWER, LTD., Yokohama (JP)

( * ) Notice: Subject to any disclaimer, the term of this patent is extended or adjusted under 35 U.S.C. 154(b) by 0 days.

(21) Appl. No.: 16/969,264

(22) PCT Filed: Feb. 12, 2019

(86) PCT No.: PCT/JP2019/004798
§ 371 (c)(1),
(2) Date: Aug. 12, 2020

(87) PCT Pub. No.: WO2019/159873
PCT Pub. Date: Aug. 22, 2019

(65) Prior Publication Data
US 2021/0002566 A1 Jan. 7, 2021

(30) Foreign Application Priority Data
Feb. 19, 2018 (JP) .............................. JP2018-027107

(51) Int. Cl.
*C10J 3/50* (2006.01)
*C10J 3/72* (2006.01)

(52) U.S. Cl.
CPC ............... *C10J 3/506* (2013.01); *C10J 3/723* (2013.01); *C10J 2200/152* (2013.01);
(Continued)

(58) Field of Classification Search
CPC .. C10J 3/50; C10J 2200/15–152; B65G 53/04
See application file for complete search history.

(56) References Cited

U.S. PATENT DOCUMENTS 3,390,971 A * 7/1968 Aldwyn ..................... C10J 3/74
48/63
4,483,199 A * 11/1984 Beiermann ............... G01F 1/74
73/861.04
(Continued)

FOREIGN PATENT DOCUMENTS

CN 1037358 A 11/1989
CN 1039835 A 2/1990
(Continued)

OTHER PUBLICATIONS

Polish Search Report dated Jan. 13, 2021, issued in counterpart application No. P 436360, with English translation. (14 pages).
(Continued)

*Primary Examiner* — Matthew J Merkling
(74) *Attorney, Agent, or Firm* — Westerman, Hattori, Daniels & Adrian, LLP

(57) ABSTRACT

Provided is a powder fuel supply apparatus comprising a distributor (84) that branches supplied powder fuel to a plurality of branch tubes (82), a plurality of burners (126*a*) connected to downstream ends (82*a*) of the plurality of branch tubes (82), respectively, to supply char into a gasification furnace that gasifies the powder fuel, a flow nozzle (85) provided in each of the plurality of branch tubes (82), to apply pressure loss to char flow in the branch tube (82), a differential pressure gauge (86) that measures a differential pressure generated by the flow nozzle (85), and a control unit that determines decrease in flow velocity of the char flow based on the differential pressure obtained by the differential pressure gauge (86).

5 Claims, 9 Drawing Sheets

(52) U.S. Cl.
CPC .. *C10J 2300/093* (2013.01); *C10J 2300/1606* (2013.01); *C10J 2300/1653* (2013.01); *C10J 2300/1675* (2013.01)

(56) References Cited

U.S. PATENT DOCUMENTS

| | | | |
|---|---|---|---|
| 4,791,817 A | 12/1988 | Albertz et al. | |
| 4,936,870 A * | 6/1990 | Baumann | C10J 3/466 48/197 R |
| 4,971,600 A | 11/1990 | Baumann et al. | |
| 5,048,761 A * | 9/1991 | Kim | B65G 53/66 241/19 |
| 8,512,446 B2 * | 8/2013 | Mazumdar | C10J 3/506 95/172 |
| 8,667,912 B2 * | 3/2014 | Koyama | F23J 9/00 110/186 |
| 2010/0126067 A1 | 5/2010 | Koyama et al. | |
| 2014/0151191 A1 * | 6/2014 | Stevenson | C10J 3/30 198/572 |
| 2014/0231239 A1 * | 8/2014 | Koyama | B65G 53/18 202/261 |
| 2017/0260465 A1 | 9/2017 | Soda et al. | |
| 2019/0055485 A1 | 2/2019 | Kasai et al. | |

FOREIGN PATENT DOCUMENTS

| | | |
|---|---|---|
| CN | 101688663 A | 3/2010 |
| CN | 202186991 U | 4/2012 |
| CN | 103113925 A | 5/2013 |
| EP | 2 213 937 A1 | 8/2010 |
| JP | S53-085531 A | 7/1978 |
| JP | S54-138101 U | 9/1979 |
| JP | S58-056050 B2 | 12/1983 |
| JP | S59-219390 A | 12/1984 |
| JP | S60-110786 A | 6/1985 |
| JP | S61-231324 A | 10/1986 |
| JP | H03-025202 A | 2/1991 |
| JP | H10-292182 A | 11/1998 |
| JP | 2002-161284 A | 6/2002 |
| JP | 3364030 B2 | 1/2003 |
| JP | 2012-162660 A | 8/2012 |
| JP | 5721612 B2 | 5/2015 |
| JP | 2017-110165 A | 6/2017 |
| WO | 2009/069330 A1 | 6/2009 |
| WO | 2016/043167 A1 | 3/2016 |
| WO | 2017/141632 A1 | 8/2017 |

OTHER PUBLICATIONS

Office Action dated Mar. 29, 2021, issued in counterpart CN Application No. 201980011583.9, with English Translation. (24 pages).

International Search Report dated Apr. 2, 2019, issued in counterpart Application No. PCT/JP2019/004798, with English translation. (5 pages).

Written Opinion dated Apr. 2, 2019, issued in counterpart Application No. PCT/JP2019/004798, with English translation. (10 pages).

Office Action dated Jan. 11, 2022, issued in counterpart JP Application No. 2018-027107, with English Translation, (7 pages).

* cited by examiner

POWDER FUEL SUPPLY APPARATUS, GASFIER UNIT, INTEGRATED GASIFICATION COMBINED CYCLE, AND CONTROL METHOD OF POWDER FUEL SUPPLY APPARATUS

TECHNICAL FIELD

The present invention relates to a powder fuel supply apparatus that supplies powder fuel into a gasification furnace, gasifier unit, integrated gasification combined cycle, and a control method of a powder fuel supply apparatus.

BACKGROUND ART

Heretofore, as gasifier unit, there has been known carbonaceous feedstock gasifier unit (coal gasifier unit) that supplies carbonaceous feedstock of coal or the like into a gasification furnace, partially combusts the carbonaceous feedstock, and gasifies the fuel to generate combustible gas. Hereinafter, a case of using coal as an example of the carbonaceous feedstock will be described.

In the coal gasifier unit, a fuel supply apparatus that supplies powder fuel, such as pulverized coal or char (powder comprising an unreacted portion and ash of coal), together with nitrogen (an inert gas) into the gasification furnace is known (e.g., Patent Citation 1).

Patent Citation 1: Japanese Unexamined Patent Application, Publication No. 2012-162660

DISCLOSURE OF INVENTION

In a case of using pulverized coal as fuel to be gasified, an amount of char to be generated changes in accordance with a property of coal or the like (carbonaceous feedstock) for use. If the char amount changes during conveyance of the char into a gasification furnace with an inert gas of nitrogen or the like, a flow rate of the char to be supplied to the gasification furnace might change. Consequently, an operation is performed while varying a flow velocity of the char in a conveyance tube.

To convey powder fuel such as char or pulverized coal, it is necessary to convey the powder fuel at a flow velocity of a predetermined value or more so that the conveyance does not become unstable due to sedimentation of the powder fuel in the conveyance tube. Particularly, in a case where multiple types of coal are supplied to the gasification furnace and the furnace is operated while switching the coal type, the char flow velocity might change due to change in char amount in accordance with the coal type. In a case where the flow velocity of the char being conveyed is low, there is concern that the char sediments due to its gravity in the conveyance tube to generate a conveyance defect. Therefore, it is desired that the low flow velocity of the char being conveyed, which is a cause for the char conveyance defect, is to be reliably detected.

Furthermore, it is necessary to consider impact of the low flow velocity of the char being conveyed. That is, if the conveyance defect due to the char sedimentation in the char conveyance tube is generated, an interior of the char conveyance tube may be purged. This purge is performed after the conveyance of the char is stopped once. Consequently, the purge is noticeably influenced by radiation from inside the gasification furnace to a burner tip. This is because during normal operation, powder of char jetted toward the gasification furnace flows like a curtain to the burner tip, and blocks the radiation from inside the furnace to the burner tip. Therefore, when the conveyance of the char is stopped, a temperature of the burner tip rises, and wear on the burner tip accelerates. If the burner tip is worn, an injection angle of burner jet spreading from the burner tip spreads. Then, jet flow of pulverized fuel jetted from the burner comes in contact with a burner cooling tube wound around a circumference of the burner tip. If the wear proceeds beyond normal operating conditions, there is concern that the wear leads to leakage. Therefore, in a case where the conveyance defect of the char is generated, it is desired to recover the flow velocity of the char being conveyed while considering the influence on suppression of the wear on the burner tip.

Furthermore, the above described problem as to the char conveyance defect also applies to a conveyance defect of another powder fuel such as pulverized coal.

The present disclosure has been developed in view of such situations, and in a powder fuel supply apparatus, gasifier unit, integrated gasification combined cycle and a control method of the powder fuel supply apparatus of the present disclosure, an object is to reliably detect decrease in powder fuel flow velocity that is a cause for a conveyance defect of powder fuel in a conveyance tube.

Furthermore, in the powder fuel supply apparatus, the gasifier unit, the integrated gasification combined cycle, and the control method of the powder fuel supply apparatus of the present disclosure, an object is to recover from decrease in powder fuel flow velocity while suppressing wear on a burner tip inside the furnace in a case where a conveyance defect of powder fuel is generated.

A powder fuel supply apparatus according to an aspect of the present disclosure comprises a distributor that branches supplied powder fuel to a plurality of branch tubes, a plurality of burners connected to downstream ends of the plurality of branch tubes, respectively, to supply the powder fuel into a gasification furnace that gasifies the powder fuel, a resistor provided in each of the plurality of branch tubes, to apply pressure loss to powder fuel flow in the branch tube, a pressure loss measuring unit for measuring a differential pressure generated by the resistor, and a control unit that determines decrease in flow velocity of the powder fuel based on the differential pressure.

The distributor is connected to the plurality of branch tubes, and the powder fuel is supplied from the burner connected to the downstream end of each branch tube into the gasification furnace that gasifies the powder fuel. Each of the plurality of branch tubes is provided with the resistor that applies the pressure loss to the powder fuel flow so that flow rates of the respective branch tubes become equal. The resistor is provided with the pressure loss measuring unit for measuring the pressure loss generated by the resistor as the differential pressure. Then, the control unit determines the decrease in powder fuel flow velocity based on the differential pressure obtained by the pressure loss measuring unit. Consequently, the decrease in powder fuel flow velocity can be reliably detected, and a conveyance defect generated due to sedimentation of powder in the branch tube can be grasped in advance.

The determination is made based on the pressure loss, and hence the decrease in powder fuel flow velocity can be determined with less time delay.

The differential pressure that is the pressure loss of the resistor is measured with the pressure loss measuring unit, and a position to measure the pressure is limited to a predetermined region. Consequently, generation of reduction of a channel area due to the sedimentation of the powder can be avoided by the resistor in a region where the pressure loss is measured. Consequently, the conveyance defect can be accurately determined.

Furthermore, the powder fuel supply apparatus according to an aspect of the present disclosure comprises an inert gas additional supply unit for additionally supplying an inert gas to powder fuel flow of pulverized fuel flowing together with the inert gas toward the distributor, and a control unit that increases a flow rate of the inert gas to be additionally supplied from the inert gas additional supply unit in a case where decrease in flow velocity of the powder fuel flowing through the branch tube is determined based on the differential pressure.

In a case of determining the decrease in powder fuel flow velocity based on the differential pressure measured by using the pressure loss measuring unit, the flow rate of the inert gas to be additionally supplied from the inert gas additional supply unit is increased. Consequently, it is possible to recover from the decrease in powder fuel flow velocity while continuously supplying the powder fuel from the burner into the furnace, and a curtain effect by the powder fuel flow of the powder fuel can be maintained. Consequently, radiation from inside the gasification furnace to a burner tip is blocked, so that wear on the burner tip inside the gasification furnace can be suppressed.

A powder fuel supply apparatus according to an aspect of the present disclosure comprises a distributor that branches supplied powder fuel to a plurality of branch tubes, a plurality of burners connected to downstream ends of the plurality of branch tubes, respectively, to supply the powder fuel into a gasification furnace that gasifies the powder fuel, a temperature measuring unit for measuring a downstream end temperature in the downstream end of each of the branch tubes, and a control unit that determines decrease in flow velocity of the powder fuel based on the downstream end temperature.

The distributor is connected to the plurality of branch tubes, and the powder fuel is supplied from the burner connected to the downstream end of each branch tube into the gasification furnace that gasifies the powder fuel. The temperature measuring unit for measuring the temperature in the downstream end of the branch tube as the downstream end temperature is provided, and the decrease in powder fuel flow velocity is determined based on the downstream end temperature obtained by the temperature measuring unit. For example, if a ratio of the powder fuel in the powder fuel flow changes, heat transfer to the branch tube changes, and the temperature of the branch tube changes. The decrease in powder fuel flow velocity can be determined. Consequently, the decrease in powder fuel flow velocity can be reliably detected, and a conveyance defect generated due to sedimentation of powder in the branch tube can be grasped in advance. As the change in downstream end temperature, a change amount of the temperature to time may be used, or a differential value of the temperature to the time may be used. The determination can be made faster in a case where the differential value is used than in a case where the change amount of the temperature is used.

The temperature measuring unit is provided in the downstream end of the branch tube, i.e., close to the burner, and hence the sedimentation of the powder can be determined over an entire region of the branch tube on an upstream side of a position where the temperature measuring unit is installed. Consequently, the decrease in powder fuel flow velocity can be accurately determined.

It is preferable that the temperature measuring unit is provided close to the downstream end of the branch tube. For example, it is more preferable that the unit is provided within 50 D from a connecting position to the burner, where D is a diameter of the branch tube. More specifically, the unit is provided in a range of 5 m or less from the connecting position to the burner.

Furthermore, the powder fuel supply apparatus according to an aspect of the present disclosure comprises an inert gas additional supply unit for additionally supplying an inert gas to powder fuel flow of pulverized fuel flowing together with the inert gas toward the distributor, and a control unit that increases a flow rate of the inert gas to be additionally supplied from the inert gas additional supply unit in a case where decrease in flow velocity of the powder fuel flowing through the branch tube is determined based on the downstream end temperature.

In a case of determining the decrease in powder fuel flow velocity based on the downstream end temperature measured by using the temperature measuring unit, the flow rate of the inert gas to be additionally supplied from the inert gas additional supply unit is increased. Consequently, it is possible to recover from the decrease in powder fuel flow velocity while continuously supplying the powder fuel from the burner into the furnace, and the curtain effect by the powder fuel flow of the powder fuel can be maintained. Consequently, radiation from inside the gasification furnace to the burner tip is blocked, so that the wear on the burner tip inside the gasification furnace can be suppressed.

Additionally, in the powder fuel supply apparatus according to an aspect of the present disclosure, the branch tube comprises a powder fuel density measuring unit for measuring a density of the powder fuel.

The branch tube is provided with the powder fuel density measuring unit for measuring the density of the powder fuel, so that a mass flow rate of powder fuel flow can be obtained. Consequently, the decrease in powder fuel flow velocity can be more accurately determined.

As the powder fuel density measuring unit, for example, a γ-ray densimeter may be used.

Furthermore, gasifier unit according to an aspect of the present disclosure comprises the powder fuel supply apparatus according to any one of the above aspects, and the gasification furnace into which the powder fuel is supplied from the powder fuel supply apparatus.

Additionally, integrated gasification combined cycle according to an aspect of the present disclosure comprises the above gasifier unit, a gas turbine that combusts at least a part of raw syngas obtained by the gasifier unit to rotate and drive, a steam turbine that rotates and drives with steam generated by an heat recovery steam generator into which turbine flue gas discharged from the gas turbine is introduced, and a generator rotatably coupled to the gas turbine and/or the steam turbine.

In addition, a control method of a powder fuel supply apparatus according to an aspect of the present disclosure is a control method of a powder fuel supply apparatus comprising a distributor that branches supplied powder fuel to a plurality of branch tubes, a plurality of burners connected to downstream ends of the plurality of branch tubes, respectively, to supply the powder fuel into a gasification furnace that gasifies the powder fuel, a resistor provided in each of the plurality of branch tubes, to apply pressure loss to powder fuel flow in the branch tube, and a pressure loss measuring unit for measuring a differential pressure generated by the resistor, the control method of the powder fuel supply apparatus, comprising determining decrease in flow velocity of the powder fuel based on the differential pressure.

Furthermore, a control method of a powder fuel supply apparatus according to an aspect of the present disclosure is a control method of a powder fuel supply apparatus comprising a distributor that branches supplied powder fuel to a plurality of branch tubes, a plurality of burners connected to downstream ends of the plurality of branch tubes, respectively, to supply the powder fuel into a gasification furnace that gasifies the powder fuel, and a temperature measuring unit for measuring a downstream end temperature in the downstream end of each of the branch tubes, the control method of the powder fuel supply apparatus, comprising determining decrease in flow velocity of the powder fuel based on the downstream end temperature.

A pressure loss measuring unit or a temperature measuring unit is provided in a branch tube, and hence decrease in flow velocity that is a cause for a conveyance defect of powder fuel in a conveyance tube can be reliably detected.

In a case where the conveyance defect of the powder fuel is generated, a flow rate of an inert gas to be additionally supplied to powder fuel flow is increased, so that it is possible to recover from the decrease in powder fuel flow velocity while suppressing wear on a burner tip inside a furnace.

BEST MODE FOR CARRYING OUT THE INVENTION

Hereinafter, description will be made as to embodiments according to the present invention with reference to the drawings.

First Embodiment

Figure 1:
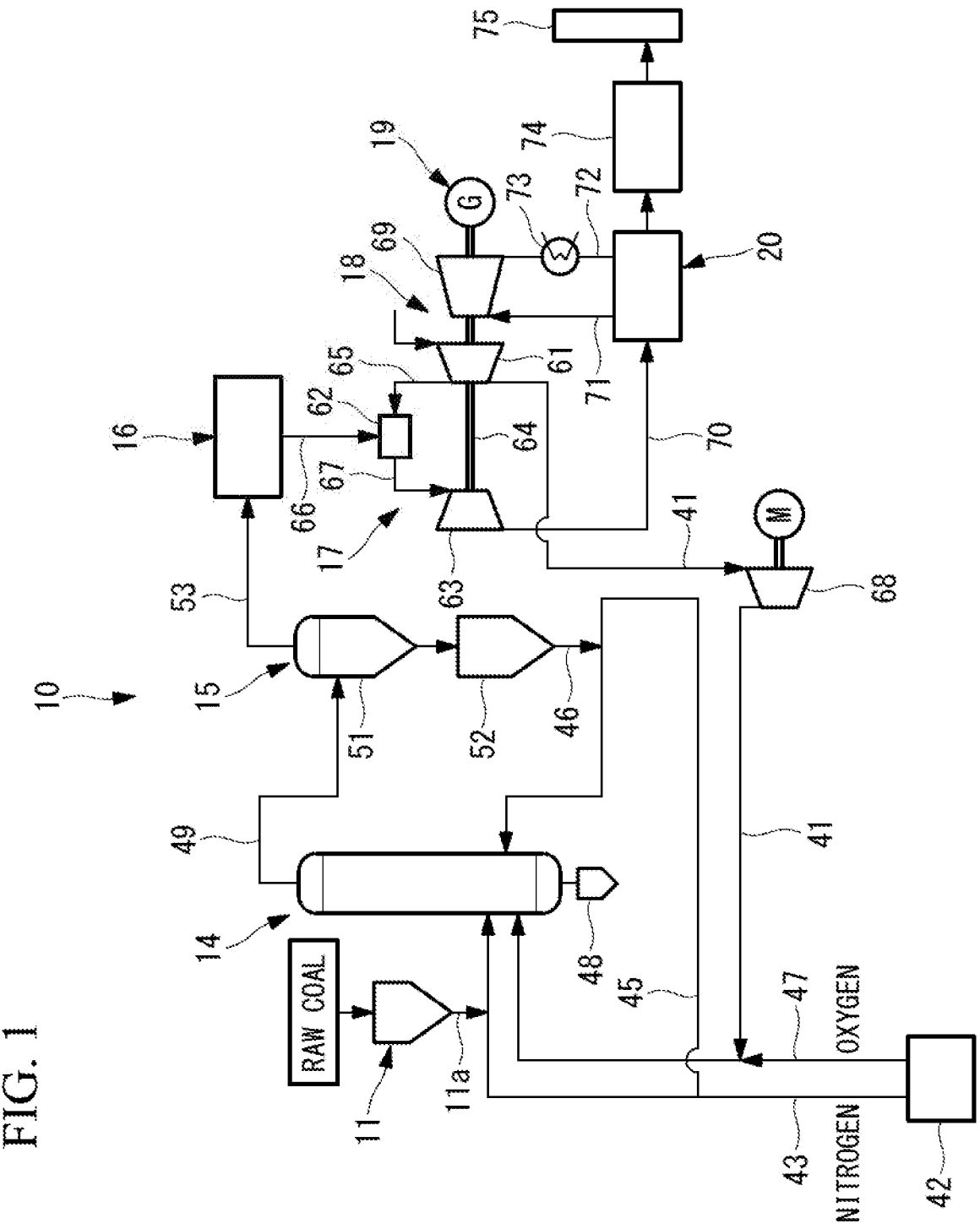
FIG. 1 is a schematic configuration diagram showing coal integrated gasification combined cycle according to a first embodiment of the present invention.

FIG. 1 shows a schematic configuration of integrated coal gasification combined cycle 10 to which gasifier unit 14 is applied.

In the integrated coal gasification combined cycle (IGCC: integrated gasification combined cycle) 10, an air-based Oxygen Containing Gas is used, and in the gasifier unit 14, an air combustion system that generates combustible gas (raw syngas) from fuel is employed. Then, in the integrated coal gasification combined cycle 10, the raw syngas obtained in the gasifier unit 14 is purified in gas clean-up unit 16 to obtain fuel gas, which is then supplied to a gas turbine 17 to generate power. That is, the integrated coal gasification combined cycle 10 serves as air combustion type (air blowing) power generation unit. As the fuel to be supplied to the gasifier unit 14, for example, carbonaceous feedstock of coal or the like is used.

Note that in the present embodiment, a positional relation between respective components described using expressions of an upper side and a lower side indicates a vertical upper side and a vertical lower side.

As shown in FIG. 1, the integrated coal gasification combined cycle (the integrated gasification combined cycle) 10 includes coal supply unit 11, the gasifier unit 14, char recovery unit 15, the gas clean-up unit 16, the gas turbine 17, a steam turbine 18, a generator 19, and an heat recovery steam generator (HRSG: a heat recovery steam generator) 20.

In the coal supply unit 11, coal that is the carbonaceous feedstock is supplied as raw coal, and pulverized with a coal pulverizer (not shown) or the like, to manufacture pulverized coal (powder fuel) pulverized in fine particles. The pulverized coal manufactured in the coal supply unit 11 is pressurized with nitrogen gas as a conveying inert gas supplied from air separation unit 42 described later at an outlet of a coal supply line 11a, and supplied toward the gasifier unit 14. The inert gas is an inert gas having an oxygen content rate of about 5 vol % or less, and typical examples of the inert gas include nitrogen gas, carbon dioxide gas and argon gas. The rate is not necessarily limited to about 5 vol % or less.

In the gasifier unit 14, the pulverized coal manufactured in the coal supply unit 11 is supplied, and char (powder fuel comprising an unreacted portion and ash of coal) recovered in the char recovery unit 15 is supplied for a purpose of reuse.

Furthermore, the gasifier unit 14 is connected to a compressed air supply line 41 from the gas turbine 17 (a compressor 61), and a part of compressed air compressed in the gas turbine 17 is boosted up to a predetermined pressure in a booster 68, and can be supplied to the gasifier unit 14. The air separation unit 42 separates and generate nitrogen and oxygen from air in atmosphere, and a first nitrogen supply line 43 connects the air separation unit 42 to the gasifier unit 14. Then, the first nitrogen supply line 43 is connected to the coal supply line 11a from the coal supply unit 11. Furthermore, a second nitrogen supply line 45 branching from the first nitrogen supply line 43 is also connected to the gasifier unit 14, and the second nitrogen supply line 45 is connected to a char return line 46 from the char recovery unit 15. Furthermore, the air separation unit 42 is connected to the compressed air supply line 41 via an oxygen supply line 47. Then, nitrogen separated by the air separation unit 42 flows through the first nitrogen supply line 43 and the second nitrogen supply line 45, and is thereby utilized as a coal or char carrier gas. Furthermore, oxygen separated by the air separation unit 42 flows through the oxygen supply line 47 and the compressed air supply line 41, and is thereby utilized as an oxidizer in the gasifier unit 14.

Figure 2:
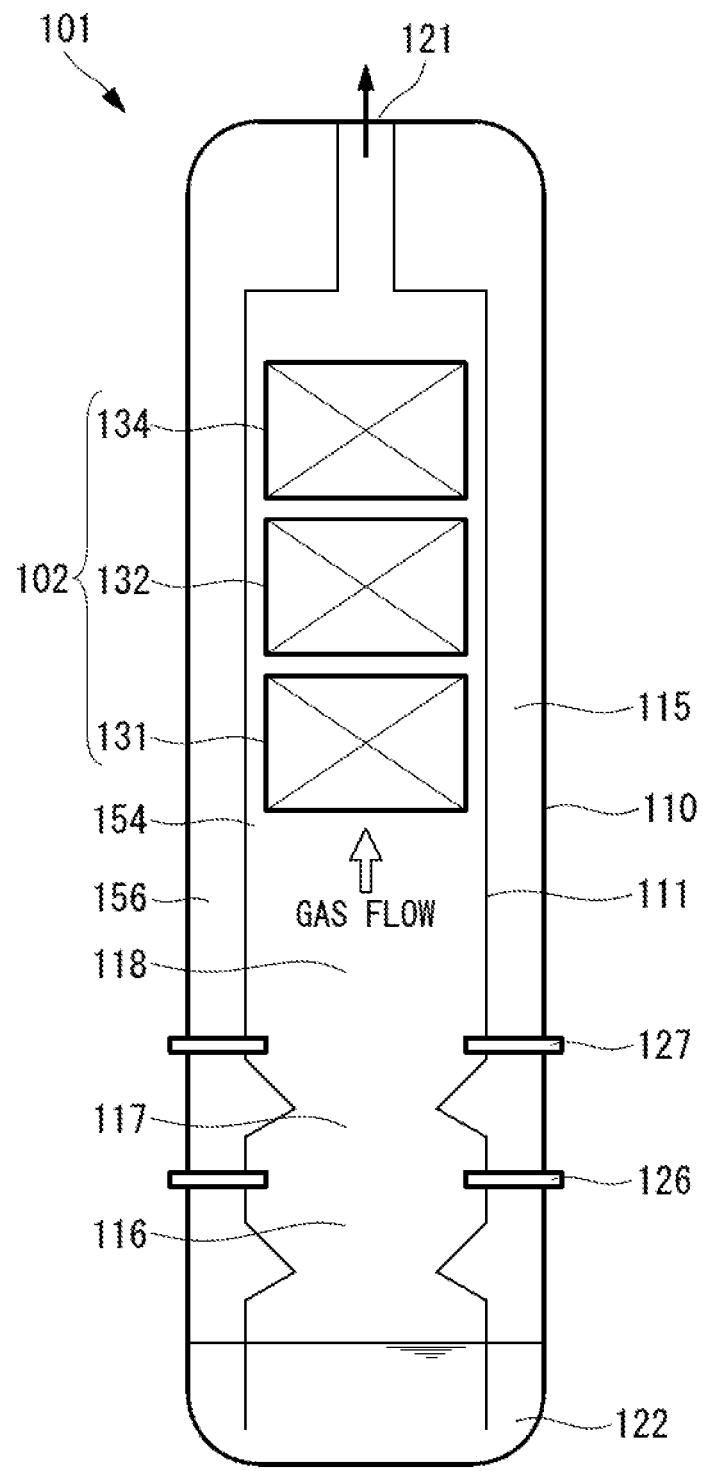
FIG. 2 is a schematic configuration diagram showing gasifier unit of FIG. 1.

The gasifier unit 14 comprises, for example, a gasification furnace 101 of a two-stage entrained bed system (see FIG. 2). The gasifier unit 14 partially combusts and gasifies coal (the pulverized coal) and char supplied inside with the oxidizer (air and oxygen) to obtain the raw syngas. Note that the gasifier unit 14 is provided with foreign matter removal unit 48 that removes foreign matter (slag) mixed in the pulverized coal. Then, the gasifier unit 14 is connected to a gas generation line 49 that supplies the raw syngas toward the char recovery unit 15, and the raw syngas including the char can be discharged. In this case, as shown in FIG. 2, the gas generation line 49 is provided with a syngas cooler 102 (a gas cooler), so that the raw syngas may be cooled down to a predetermined temperature and then supplied to the char recovery unit 15.

The char recovery unit 15 comprises dust collection unit 51 and a supply hopper 52. In this case, the dust collection unit 51 comprises one or more cyclones or porous filters, and can separate the char contained in the raw syngas obtained in the gasifier unit 14. Then, the raw syngas separated from the char is fed through a gas discharge line 53 to the gas clean-up unit 16. The supply hopper 52 stores the char separated from the raw syngas in the dust collection unit 51. Note that a bin may be disposed between the dust collection unit 51 and the supply hopper 52, and this bin may be connected to a plurality of supply hoppers 52. Then, the char return line 46 from the supply hopper 52 is connected to the second nitrogen supply line 45.

The gas clean-up unit 16 removes impurities such as a sulfur compound and a nitrogen compound from the raw syngas separated from the char by the char recovery unit 15, to purify the gas. Then, the gas clean-up unit 16 purifies the raw syngas to manufacture the fuel gas, and supplies this gas to the gas turbine 17. Note that the raw syngas separated from the char still contains a sulfur content ($H_2S$ or the like), and hence in the gas clean-up unit 16, the sulfur content is removed and recovered with an amine absorption liquid or the like, to effectively utilize the gas.

The gas turbine 17 comprises the compressor 61, a combustor 62, and a turbine 63, and the compressor 61 is coupled to the turbine 63 via a rotary shaft 64. The combustor 62 is connected to a compressed air supply line 65 from the compressor 61, is connected to fuel gas supply line 66 from the gas clean-up unit 16, and is also connected to a combustion gas supply line 67 extending toward the turbine 63. Furthermore, the gas turbine 17 is provided with the compressed air supply line 41 extending from the compressor 61 to the gasifier unit 14, and in a middle of the compressed air supply line, the booster 68 is provided. Therefore, in the combustor 62, a part of compressed air supplied from the compressor 61 and at least a part of the fuel gas supplied from the gas clean-up unit 16 are mixed and combusted to generate a combustion gas, and the generated combustion gas is supplied toward the turbine 63. Then, the turbine 63 rotates and drives the rotary shaft 64 with the supplied combustion gas to rotate and drive the generator 19.

The steam turbine 18 comprises a turbine 69 coupled to the rotary shaft 64 of the gas turbine 17, and the generator 19 is coupled to a base end of the rotary shaft 64. The heat recovery steam generator 20 is connected to an flue gas line 70 from the gas turbine 17 (the turbine 63), and heat exchange is performed between water to be supplied to the heat recovery steam generator 20 and flue gas of the turbine 63, to generate steam. Then, a steam supply line 71 is provided and a steam recovery line 72 is also provided between the heat recovery steam generator 20 and the turbine 69 of the steam turbine 18, and the steam recovery line 72 is provided with a condenser 73. Furthermore, the steam generated in the heat recovery steam generator 20 may include steam generated by heat exchange with the raw syngas in the syngas cooler 102 of the gasification furnace 101. Therefore, in the steam turbine 18, the turbine 69 rotates and drives with the steam supplied from the heat recovery steam generator 20, to rotate the rotary shaft 64 and thereby rotate and drive the generator 19.

Gas purification unit 74 is provided between an outlet of the heat recovery steam generator 20 and a stack 75.

Next, an operation of the integrated coal gasification combined cycle 10 will be described.

In the integrated coal gasification combined cycle 10, upon supply of the raw coal (the coal) to the coal supply unit 11, the coal is pulverized into fine particles in the coal supply unit 11 to obtain the pulverized coal. The pulverized coal manufactured in the coal supply unit 11 flows through the first nitrogen supply line 43 with nitrogen supplied from the air separation unit 42, and is supplied to the gasifier unit 14. Furthermore, the char recovered in the char recovery unit 15 described later flows through the second nitrogen supply line 45 with nitrogen supplied from the air separation unit 42, and is supplied to the gasifier unit 14. Furthermore, the compressed air extracted from the gas turbine 17 described later is boosted in the booster 68, and is then supplied, together with oxygen supplied from the air separation unit 42, through the compressed air supply line 41 to the gasifier unit 14.

In the gasifier unit 14, the supplied pulverized coal and char are combusted with the compressed air (oxygen), and the pulverized coal and char are gasified, to obtain the raw syngas. Then, this raw syngas is discharged from the gasifier unit 14 through the gas generation line 49, and fed to the char recovery unit 15.

In the char recovery unit 15, the raw syngas is first supplied to the dust collection unit 51, so that the fine particles of char contained in the raw syngas are separated. Then, the raw syngas separated from the char is fed through the gas discharge line 53 to the gas clean-up unit 16. On the other hand, the fine particles of char separated from the raw syngas are deposited in the supply hopper 52, and returned through the char return line 46 back to the gasifier unit 14, to be recycled.

In the gas clean-up unit 16, the impurities, such as the sulfur compound and the nitrogen compound, are removed from the raw syngas from which the char is separated by the char recovery unit 15, and the gas is purified to manufacture the fuel gas. The compressor 61 generates the compressed air and supplies the air to the combustor 62. The combustor 62 mixes the compressed air supplied from the compressor 61 and the fuel gas supplied from the gas clean-up unit 16, and combusts the mixed gas to generate the combustion gas. This combustion gas rotates and drives the turbine 63, to rotate and drive the compressor 61 and the generator 19 via the rotary shaft 64. Thus, the gas turbine 17 can generate the power.

Then, in the heat recovery steam generator 20, heat exchange is performed between the flue gas discharged from the turbine 63 in the gas turbine 17 and water to be supplied to the heat recovery steam generator 20, to generate the steam, and the generated steam is supplied to the steam turbine 18. In the steam turbine 18, the steam supplied from the heat recovery steam generator 20 rotates and drives the turbine 69, and the generator 19 rotates and drives via the rotary shaft 64, so that the power can be generated.

Note that the gas turbine 17 and the steam turbine 18 coaxially rotate and drive the one generator 19, and in place of this configuration, the turbines as separate axes may rotate and drive a plurality of generators.

Afterward, the gas purification unit 74 removes toxic substances from the exhaust gas discharged from the heat recovery steam generator 20, and the purified exhaust gas is released from the stack 75 to the atmosphere.

Next, description will be made in detail as to the gasifier unit 14 in the integrated coal gasification combined cycle 10 described above, with reference to FIG. 1 and FIG. 2.

As shown in FIG. 2, the gasifier unit 14 comprises the gasification furnace 101, and the syngas cooler 102.

The gasification furnace 101 is formed to extend in a vertical direction, and has a lower side in the vertical direction to which the pulverized coal and oxygen are supplied, and partially combusted. The gasified raw syngas flows from the lower side toward an upper side in the vertical direction. The gasification furnace 101 includes a pressure vessel 110, and a gasification furnace wall 111 provided in the pressure vessel 110. Then, in the gasification furnace 101, an annulus part 115 is formed in a space between the pressure vessel 110 and the gasification furnace wall 111. Furthermore, in the gasification furnace 101, a combustor part 116, a diffusor part 117 and a reductor part 118 are formed in order from the lower side in the vertical direction (i.e., an upstream side in a flow direction of the raw syngas) in a space in the gasification furnace wall 111.

The pressure vessel 110 is formed in a tubular shape having a hollow space therein, and a gas discharge port 121 is formed in an upper end, while a slag bath 122 is formed in a lower end (a bottom). The gasification furnace wall 111 is formed in a tubular shape having a hollow space therein, and a surface of the wall is provided opposite to an inner surface of the pressure vessel 110. In the present embodiment, the pressure vessel 110 has a cylindrical shape, and the diffusor part 117 of the gasification furnace wall 111 is also formed in a cylindrical shape. Then, the gasification furnace wall 111 is coupled to the inner surface of the pressure vessel 110 with an unshown support member.

The gasification furnace wall 111 separates an interior of the pressure vessel 110 into an internal space 154 and an external space 156. The gasification furnace wall 111 has a transverse sectional shape that changes in the diffusor part 117 between the combustor part 116 and the reductor part 118. The gasification furnace wall 111 has an upper end on the vertical upper side connected to a gas discharge port 121 of the pressure vessel 110, and has a lower end on the vertical lower side provided via a space from the bottom of the pressure vessel 110. Then, water is stored in the slag bath 122 formed in the bottom of the pressure vessel 110, and the stored water flows into the lower end of the gasification furnace wall 111, to seal inside and outside the gasification furnace wall 111. Burners 126 and 127 are inserted in the gasification furnace wall 111, and the syngas cooler 102 is disposed in the internal space 154. A structure of the gasification furnace wall 111 will be described later.

The annulus part 115 is a space formed inside the pressure vessel 110 and outside the gasification furnace wall 111, i.e., the external space 156 to which nitrogen that is the inert gas separated in the air separation unit 42 is supplied through an unshown nitrogen supply line. Consequently, the annulus part 115 is a space filled with nitrogen. Note that in a vicinity of an upper portion of the annulus part 115 in the vertical direction, an unshown in-furnace pressure equalizing tube is provided to equalize a pressure in the gasification furnace 101. The in-furnace pressure equalizing tube is provided to communicate inside and outside the gasification furnace wall 111, and the pressure is almost equalized so that a difference in pressure between an interior of the gasification furnace wall 111 (the combustor part 116, the diffusor part 117 and the reductor part 118) and an exterior thereof (the annulus part 115) is within a predetermined pressure.

The combustor part 116 is a space to partially combust the pulverized coal, char and air, and in the gasification furnace wall 111 defining the combustor part 116, a combustion device comprising a plurality of burners 126 is disposed. High-temperature combustion gas with which the pulverized coal and a part of the char are combusted in the combustor part 116 passes through the diffusor part 117 to flow into the reductor part 118.

The reductor part 118 is a space that is maintained in a high-temperature state required for gasification reaction, and in the space, the pulverized coal is supplied to the combustion gas from the combustor part 116, partially combusted, decomposed into a volatile content (carbon monoxide, hydrogen, lower hydrocarbon or the like), and gasified to obtain the raw syngas. In the gasification furnace wall 111 defining the reductor part 118, a combustion device comprising a plurality of burners 127 is disposed.

The syngas cooler 102 is provided in the gasification furnace wall 111, and provided on an upper side of the burner 127 of the reductor part 118 in the vertical direction. The syngas cooler 102 is a heat exchanger, and is provided with an evaporator 131, a superheater 132, and an economizer 134 in order from a lower side of the gasification furnace wall 111 in the vertical direction (an upstream side in a flow direction of the raw syngas). Heat exchange is performed between the syngas cooler 102 and the raw syngas obtained in the reductor part 118, to cool the raw syngas. Furthermore, there are not any restrictions on a number of the evaporators 131, superheaters 132, or economizers 134 illustrated in the drawing.

The gasifier unit 14 described above operates as follows.

In the gasification furnace 101 of the gasifier unit 14, nitrogen and pulverized coal are thrown inside and ignited by the burner 127 of the reductor part 118, and the pulverized coal and char together with compressed air (oxygen) are thrown inside and ignited by the burner 126 of the combustor part 116. Then, in the combustor part 116, high-temperature combustion gas is generated by combustion of the pulverized coal and char. Furthermore, in the combustor part 116, molten slag is generated in the high-temperature gas by the combustion of the pulverized coal and char, and this molten slag adheres to the gasification furnace wall 111, drops down to a furnace bottom and is finally discharged to stored water in the slag bath 122. Then, the high-temperature combustion gas generated in the combustor part 116 rises through the diffusor part 117 to the reductor part 118. In the reductor part 118, the gas is maintained in a high-temperature state required for the gasification reaction, and the pulverized coal is mixed with the high-temperature combustion gas. The pulverized coal is partially combusted to perform the gasification reaction in a high-temperature reducing atmosphere, and the raw syngas is obtained. The gasified raw syngas flows from the lower side toward the upper side in the vertical direction.

[Char Supply System]

Next, with reference to FIG. 3 and FIG. 4, description will be made as to a char supply system (a powder fuel supply apparatus) that supplies the char from the supply hopper 52 in which the char is stored (see FIG. 1) to a char burner 126a to which the char is to be supplied among a plurality of provided burners 126 (see FIG. 2).

Figure 3:
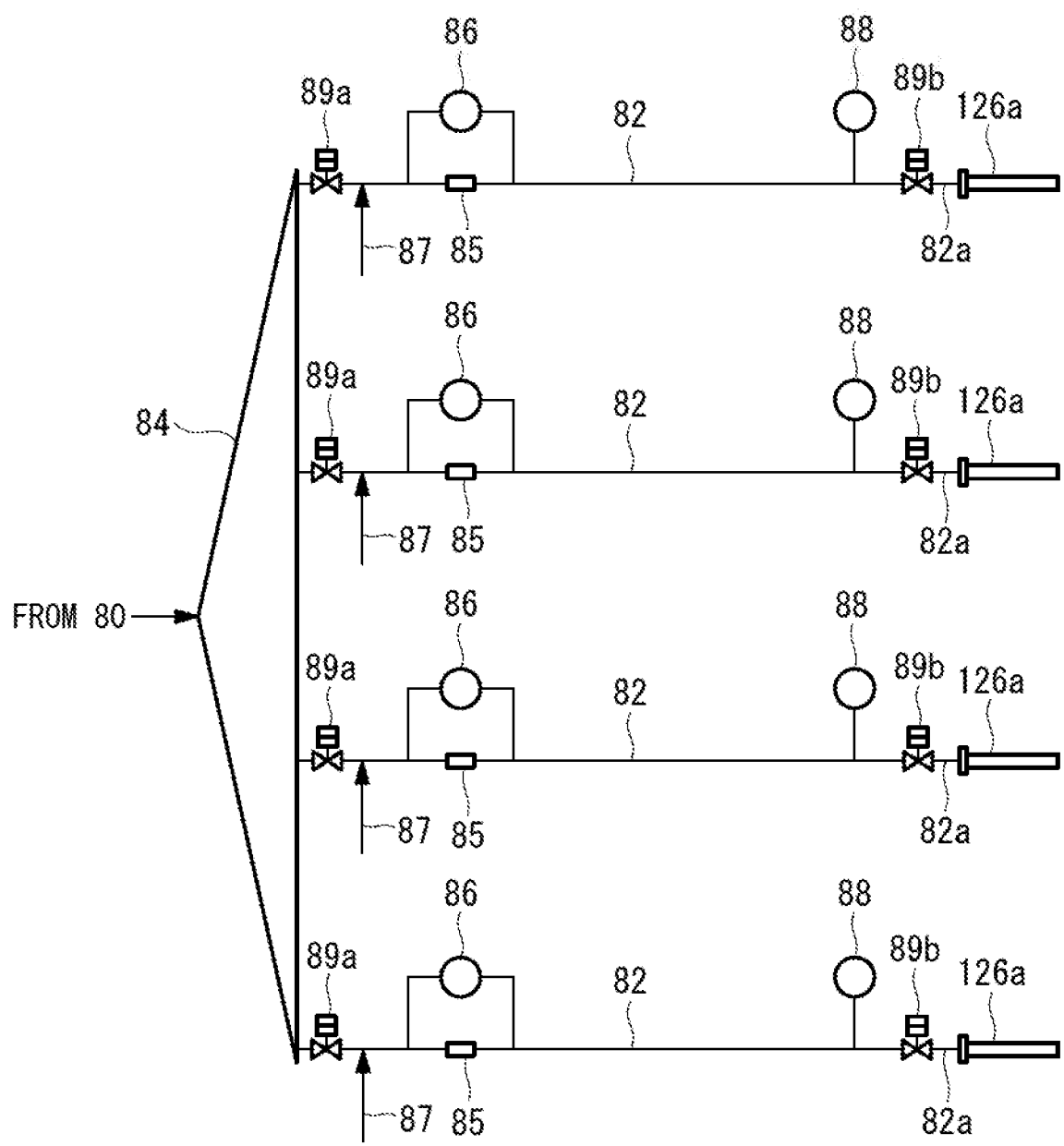
FIG. 3 is a schematic configuration diagram showing a char supply system.

FIG. 3 shows a burner distributor (a distributor) 84 that distributes the char guided from a burner joiner 80 (see FIG. 4) to a plurality of branch tubes 82. FIG. 3 shows four branch tubes 82, but at least two or more branch tubes 82 may be only provided in parallel. A downstream end 82a of each branch tube 82 is connected to the char burner 126a.

Each branch tube 82 is provided with a flow nozzle (a resistor) 85. The flow nozzle 85 applies pressure loss to char flow, and is formed as a nozzle with a reduced channel area. The flow nozzle 85 applies the pressure loss to the char flow (a mixed fluid of nitrogen and char), so that a flow rate of the char flow in the respective branch tubes 82 can be equally distributed.

A differential pressure gauge (a pressure loss measuring unit) 86 is provided before and after the flow nozzle 85. Note that in place of the differential pressure gauges 86, pressure gauges may be individually provided before and after the flow nozzles 85 to measure a differential pressure of the flow nozzles 85. The differential pressure that is the pressure loss of the flow nozzle 85 is measured with the differential pressure gauge 86. The differential pressure gauge 86 is provided closely before and after the flow nozzle 85 so that pressure loss other than the pressure loss of the flow nozzle 85 is not included. An output of the differential pressure from the differential pressure gauge 86 is transmitted to an unshown control unit.

Furthermore, the respective branch tubes 82 branched from the burner distributor 84 individually include systems of the char burners 126a, and differ in state of pressure loss, respectively. Consequently, each branch tube 82 may be provided with the differential pressure gauge 86 so that the differential pressure of the char flow is grasped with less time delay.

A purge nitrogen supply pipe 87 is connected to an upstream side (a burner distributor 84 side) of the differential pressure gauge 86 provided in each branch tube 82. In a case where the char sediments and stays in the char branch tube 82, purging nitrogen is supplied from the purge nitrogen supply pipe 87 at a constant flow rate to convey, to the char burner 126a, the char that sediments and stays in the branch tube 82.

A temperature sensor (a temperature measuring unit) 88 of a thermocouple or the like is provided in a vicinity of the downstream end 82a of each branch tube 82. The temperature sensor 88 is configured to measure a downstream end temperature that is a metal temperature of the branch tube 82 in the vicinity of the downstream end 82a. Thus, the temperature sensor is provided close to the char burner 126a, and hence the metal temperature of the branch tube 82 in which a sedimentation state of powder is reflected is measured over an entire region of the branch tube on an upstream side of a position where the temperature sensor 88 is installed. An output of the temperature sensor 88 is transmitted to the unshown control unit.

A conveyance tube shut-off valve 89a and a burner inlet shut-off valve 89b are provided to sandwich therebetween a joining position of the branch tube 82 and the purge nitrogen supply pipe 87, and the temperature sensor 88. An opening and closing operation of the conveyance tube shut-off valve 89a and the burner inlet shut-off valve 89b is controlled by the control unit (not shown in the drawing). The conveyance tube shut-off valve 89a and the burner inlet shut-off valve 89b are normally opened during a normal operation. When the purging nitrogen is supplied from the purge nitrogen supply pipe 87, the conveyance tube shut-off valve 89a and the burner inlet shut-off valve 89b are temporarily fully closed. Afterward, the burner inlet shut-off valve 89b on a downstream side is only opened. Consequently, the char staying in the branch tube 82 is purged and conveyed to a char burner 126a side. The temperature sensor 88 is provided in the downstream end 82a in the vicinity of the char burner 126a, and hence it is preferable that the temperature sensor 88 and the burner inlet shut-off valve 89b are installed continuously in the downstream end 82a. Alternatively, an order of the temperature sensor 88 and the burner inlet shut-off valve 89b may be changed, and the temperature sensor 88 may be installed continuously with the downstream end 82a on an after-stream side of the burner inlet shut-off valve 89b.

Figure 4:
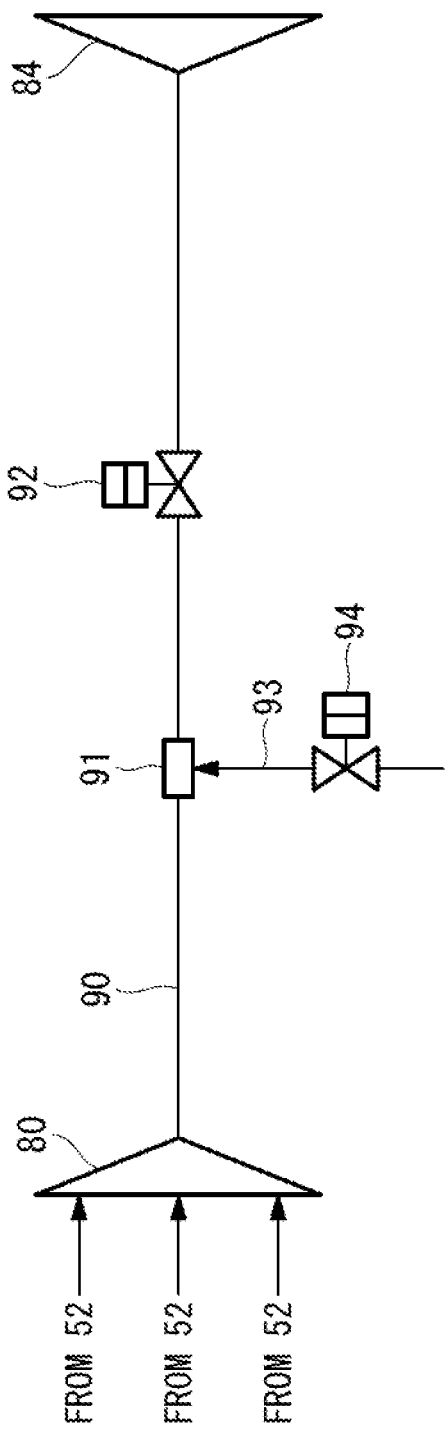
FIG. 4 is a schematic configuration diagram showing the char supply system on an upstream side of FIG. 3.

FIG. 4 shows a system on an upstream side of the burner distributor 84. On the upstream side of the burner distributor 84, the burner joiner 80 is connected via a char joining pipe 90. On an upstream side of the burner joiner 80, a plurality of supply hoppers 52 (see FIG. 1) are connected in parallel. Char flow of the mixed fluid of nitrogen and char is guided from the supply hopper 52 to the burner joiner 80.

The char joining pipe 90 is a pipe connected between the burner joiner 80 and the burner distributor 84. The char joining pipe 90 is provided with a mixing chamber 91 and a char supply flow control valve 92 in order from an upstream side of the char flow.

The mixing chamber 91 is connected to a dilution nitrogen supply pipe (an inert gas additional supply unit) 93. In the mixing chamber 91, nitrogen is additionally supplied from the dilution nitrogen supply pipe 93 to the char flow guided from the burner joiner 80. The dilution nitrogen supply pipe 93 is provided with a dilution nitrogen flow control valve 94 to adjust a flow rate of dilution nitrogen. The dilution nitrogen flow control valve 94 has an opening adjusted by the unshown control unit.

The char supply flow control valve 92 has an opening adjusted by the unshown control unit. The flow rate of the char flow to be supplied to the burner distributor 84 is determined with the char supply flow control valve 92.

The unshown control unit comprises, for example, a central processing unit (CPU), a random access memory (RAM), a read only memory (ROM), a computer readable storage medium and others. Then, a series of processing to achieve various functions is, for example, stored in a program form in the storage medium or the like, and the CPU reads this program to the RAM or the like, and executes processing and computation of information, to achieve various functions. Note that the program may be applied in a form of being installed beforehand in the ROM or another storage medium, a form of being provided in a state where the program is stored in the computer readable storage medium, a form of being distributed via a communication unit in a wired or wireless manner, or the like. Examples of the computer readable storage medium include a magnetic disk, a magneto-optical disk, a CD-ROM, a DVD-ROM, and a semiconductor memory.

Next, an operating method of the above described char supply system will be described.

As shown in FIG. 4, the mixed fluid of char and nitrogen is guided from the supply hopper 52 to the burner joiner 80, and then flows to the char joining pipe 90. In the char joining pipe 90, a predetermined amount of nitrogen is added through the dilution nitrogen supply pipe 93 to the mixing chamber 91, to dilute the fluid, and the flow rate of nitrogen is increased. Afterward, the flow rate is adjusted with the char supply flow control valve 92, and nitrogen is guided to the burner distributor 84. The char supply flow control valve 92 has the opening controlled based on an instruction of the control unit. The opening control based on total weight control is performed so that a total weight of char stored in the supply hopper 52 is constant.

The char flow guided to the burner distributor 84 is branched to the plurality of branch tubes 82 as shown in FIG. 3. The respective branch tubes 82 are provided with desired pressure loss in the flow nozzles 85, and hence the flow rate of the char flowing through the respective branch tubes 82 is equally distributed. The flow of the char flowing through each branch tube 82 is guided to the char burner 126a, and combusted in the combustor part 116 (see FIG. 2).

The differential pressure of the flow nozzle 85 is always measured with the differential pressure gauge 86. The control unit monitors the output of the differential pressure gauge 86, and determines that the flow velocity of the char flow (the flow velocity of the mixed fluid of nitrogen and char) decreases in a case where fluctuation of the differential pressure over time is in excess of a threshold. For example, if the flow velocity of the char flow decreases, the pressure loss decreases, and the differential pressure decreases. Consequently, in a case where the fluctuation is below the threshold, the decrease in flow velocity is determined. The threshold of the differential pressure fluctuation is preset in accordance with a test or simulation.

If the control unit determines that the flow velocity of the char flow decreases, the opening of the dilution nitrogen flow control valve 94 (see FIG. 4) is enlarged to increase the flow rate of dilution nitrogen to be guided to the mixing chamber 91. This increases the flow rate of the char flow to be guided to the burner distributor 84, and a problem of the decrease in flow velocity of the char flow in the branch tube 82 is eliminated.

In a case where the flow velocity of the flow of the char flowing through the branch tube 82 does not recover even if the dilution nitrogen is increased, i.e., in a case where the differential pressure obtained from the differential pressure gauge 86 is still below the threshold, it is determined that the stay of the char occurs in the branch tube 82, and the conveyance tube shut-off valve 89a and the burner inlet shut-off valve 89b shown in FIG. 3 are fully closed. Then, the purging nitrogen is supplied from the purge nitrogen supply pipe 87 into the branch tube 82 to bring the branch tube 82 in a pressurized state at a predetermined value or more. Afterward, the burner inlet shut-off valve 89b on the downstream side is only fully opened. Consequently, the char staying in the branch tube 82 is purged and conveyed to the char burner 126a side. After the purging, the supply of the purging nitrogen from the purge nitrogen supply pipe 87 is stopped, and the conveyance tube shut-off valve 89a and the burner inlet shut-off valve 89b are fully opened, to return to the normal operation.

The decrease in flow velocity of the char flow described above is individually determined for the respective branch tubes 82. Therefore, if the decrease in flow velocity of the char flow in one of the branch tubes 82 is determined, the flow rate of dilution nitrogen is increased. Then, only for the branch tube 82 in which the flow velocity of the char flow does not recover, the opening and closing operation of the conveyance tube shut-off valve 89a and the burner inlet shut-off valve 89b is performed.

In the present embodiment, the flow rate of dilution nitrogen to be guided from the dilution nitrogen supply pipe 93 to the mixing chamber 91 is increased, to increase the flow rate of the char flow to be guided to the burner distributor 84, and the problem of the decrease in flow velocity of the char flow in the branch tube 82 is eliminated. Consequently, frequency of the purging of the char staying in the branch tube 82 by the opening and closing operation of the conveyance tube shut-off valve 89a and the burner inlet shut-off valve 89b can be suppressed as much as possible. Therefore, the char in powder fuel flow jetted from the char burner 126a blocks, like a curtain, radiation from inside the gasification furnace, so that an effect of suppressing wear on a tip of the char burner 126a inside the gasification furnace can be maintained as much as possible.

According to the present embodiment, following operations and effects are produced.

The decrease in flow velocity of the char flow is determined based on the differential pressure generated due to the pressure loss of the flow nozzle 85 and obtained by the differential pressure gauge 86. Consequently, the decrease in flow velocity of the char flow can be reliably detected, and the conveyance defect generated by the sedimentation of the powder fuel (the char) in the branch tube 82 can be grasped in advance.

The decrease in flow velocity of the char flow is determined based on the differential pressure due to the pressure loss, and can be therefore determined with less time delay.

For example, in a case where one pressure sensor is installed in the char joining pipe 90 and the other pressure sensor is installed in each branch tube 82 to measure the differential pressure, the differential pressure in a case where a space between these pressure sensors is closed with the char is different from the differential pressure in a case where a space on a downstream side of the other pressure sensor installed in the branch tube 82 is closed with the char, and the conveyance defect of the char cannot be accurately determined. On the other hand, in the present embodiment, a position to measure the differential pressure with the differential pressure gauge 86 is limited to a predetermined region before and after the flow nozzle 85. Consequently, the closing with the char can be avoided by the resistor in the region where the pressure loss is measured, and the conveyance defect can be accurately determined.

In a case of determining the decrease in flow velocity of the char flow, the flow rate of the dilution nitrogen to be guided from the dilution nitrogen supply pipe 93 to the mixing chamber 91 is increased, to recover from the decrease in flow velocity of the char flow. Consequently, it is possible to recover from the decrease in flow velocity of the char flow while continuously supplying the char from the char burner 126a into the furnace, before it is determined that the char stays in the branch tube 82 and the conveyance tube shut-off valve 89a and the burner inlet shut-off valve 89b are fully closed to stop the char supply to the char burner 126a. Consequently, the flow of the powder fuel including the char can keep blocking, like the curtain, the radiation from inside the gasification furnace, and hence the wear on the tip of the char burner 126a inside the furnace can be suppressed.

Second Embodiment

Next, a second embodiment of the present invention will be described. The present embodiment is similar to the first embodiment in basic configuration, and is different therefrom in that decrease in flow velocity of char flow is determined with a temperature sensor 88. Therefore, hereinafter, description will be made mainly as to differences from the first embodiment.

Figure 5:
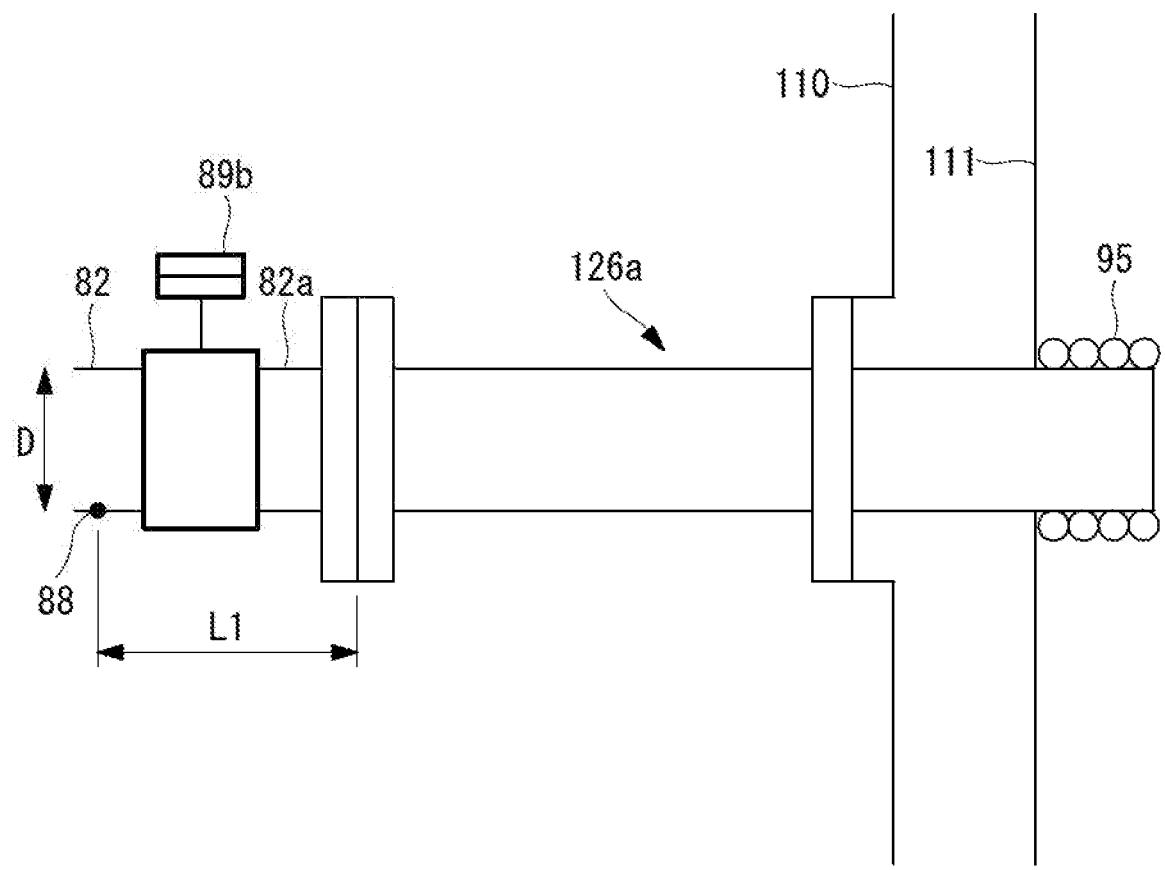
FIG. 5 is a schematic configuration diagram showing a connection between a branch tube and a char burner.

As shown in FIG. 3, the temperature sensor 88 is installed at a downstream end 82a of each branch tube 82, to measure a downstream end temperature. For example, at a position where the temperature sensor 88 is installed, as shown in FIG. 5, a distance L1 from a connecting position to a char burner 126a is 50 D or less, in which D is a diameter of the branch tube 82. More particularly, the distance L1 from the connecting position to the char burner 126a is 5 m or less, further preferably in a range of 3 m or more and 5 m or less. Note that FIG. 5 omits a burner inlet shut-off valve 89b.

As shown in FIG. 5, a tip of the char burner 126a is inserted in a gasification furnace wall 111 (in-furnace). The tip of the char burner 126a is wound with a cooling coil 95 through which cooling water flows, and the char burner 126a is cooled.

A control unit determines the decrease in flow velocity of the flow of the char flowing through the branch tube 82 based on an output of the temperature sensor 88. For example, if a ratio of an amount of the char in the char flow changes, heat transfer to the branch tube 82 changes to change a metal temperature of the branch tube 82, so that the decrease in flow velocity of the char flow can be determined. For example, in a case where a temperature of nitrogen flowing together with the char is lower than a temperature of the char, the decrease in flow velocity of the char flow indicates decrease in mass flow rate of the char, and an amount of heat to be transferred to the branch tube 82 decreases to lower the metal temperature. Therefore, in a case where the temperature measured with the temperature sensor 88 is below a threshold, the decrease in flow velocity of the char flow can be determined. Consequently, the decrease in flow velocity of the char flow can be reliably detected, and a conveyance defect generated due to sedimentation of the char in the branch tube 82 can be grasped in advance.

Furthermore, the temperature sensor 88 is installed in the downstream end 82a of each branch tube 82 close to the char burner 126a, to measure the downstream end temperature. In the temperature sensor 88, the distance L1 from the connecting position to the char burner 126a is 50 D or less, particularly within 5 m, and further preferably in a range of 3 m or more and 5 m or less. By change in downstream end temperature, the sedimentation of the char can be determined over an entire region of the branch tube 82 on an upstream side of a position where a temperature measuring unit is installed, and the decrease in flow velocity of the char flow can be more accurately determined.

Figure 6:
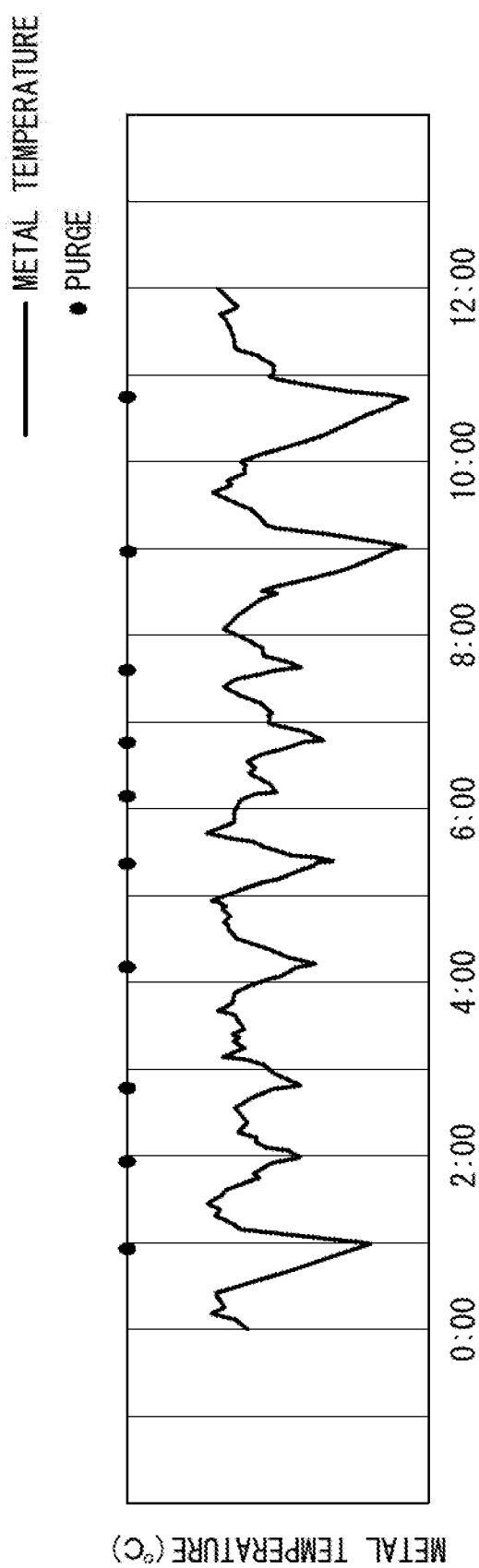
FIG. 6 is a graph showing a metal temperature of the branch tube.

FIG. 6 shows the output (indicated with the metal temperature) of the temperature sensor 88 provided in the downstream end 82a of the branch tube 82 over time. As seen from the drawing, the metal temperature drops after elapse of about 30 minutes from time 0:00. In the drawing, at time indicated with a mark of a black circle, a conveyance tube shut-off valve 89a and the burner inlet shut-off valve 89b (see FIG. 3) are closed, and purging is performed by supplying purging nitrogen from a purge nitrogen supply pipe 87. Therefore, it can be seen that the metal temperature recovers from the drop after the purging.

Figure 7:
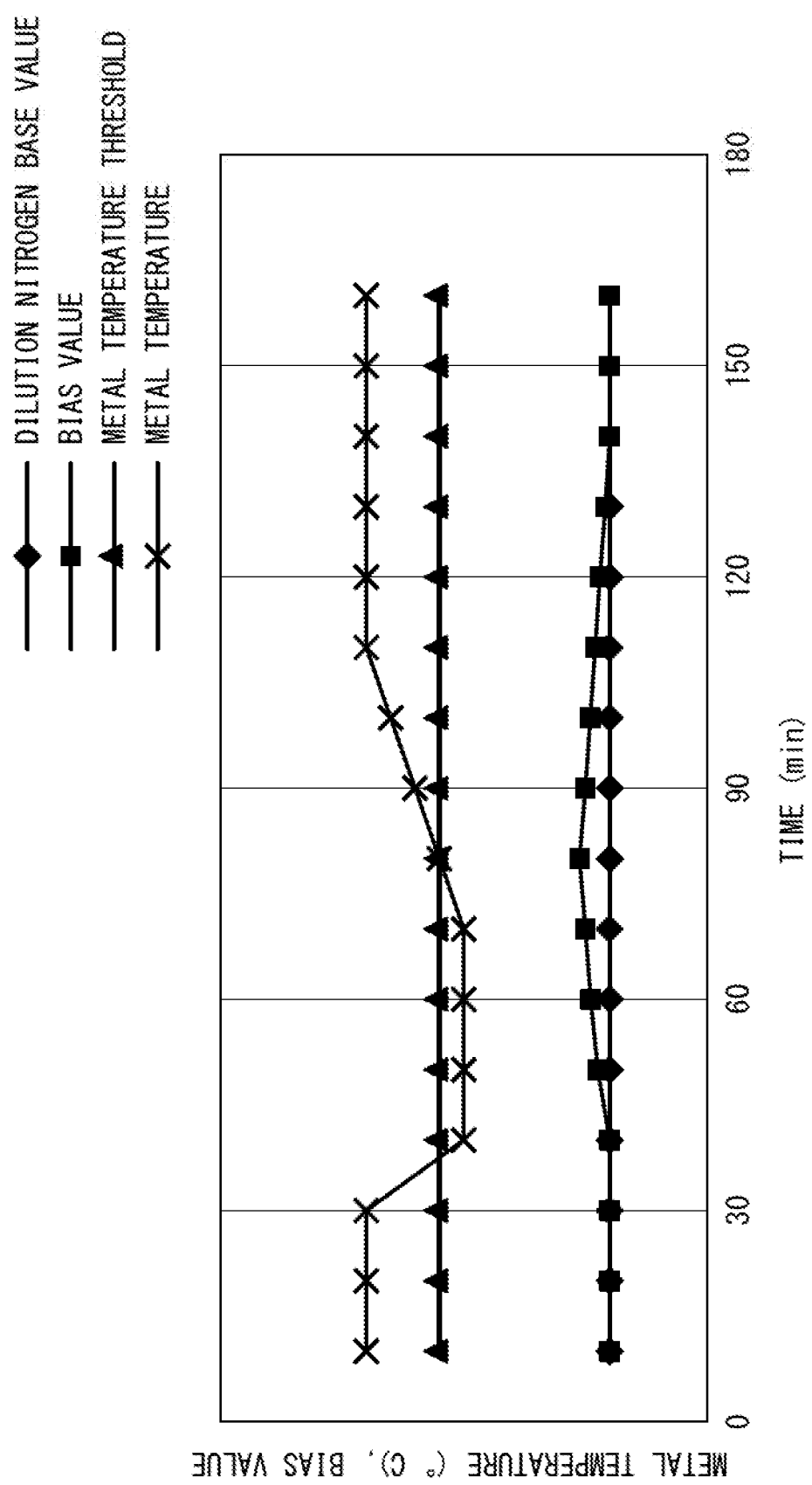
FIG. 7 is a graph showing a change in flow rate of dilution nitrogen.

In a case of increasing a flow rate of dilution nitrogen from a dilution nitrogen supply pipe 93 (see FIG. 4), as shown in FIG. 7, a bias value may be set to the dilution nitrogen. That is, a fixed dilution nitrogen base value is set beforehand, and the dilution nitrogen bias value is changed based on drop in metal temperature (the temperature of the branch tube 82) obtained in the temperature sensor 88. Referring to FIG. 7, the metal temperature begins to drop after 30 minutes, and at the metal temperature below the threshold, the dilution nitrogen bias value is increased after about 40 minutes. Then, the metal temperature recovers in excess of the metal temperature threshold, and then the dilution nitrogen bias value is gradually decreased.

The dilution nitrogen bias value is changed based on the drop in metal temperature (the temperature of the branch tube 82) obtained in the temperature sensor 88, and the dilution nitrogen bias value is increased, so that the metal temperature recovers. That is, it is possible to recover from the decrease in flow velocity of the char flow, and to inhibit the char from being sedimented in the branch tube 82. Consequently, frequency of a purge operation of the char staying in the branch tube 82 by an opening and closing operation of the conveyance tube shut-off valve 89a and the burner inlet shut-off valve 89b can be decreased. Powder fuel flow of char jetted from the char burner 126a can continue to block, like a curtain, radiation from inside a gasification furnace, and wear on a tip of the char burner 126a inside the gasification furnace can be suppressed.

According to the present embodiment, following operations and effects are produced.

The decrease in flow velocity of the char flow is determined based on the downstream end temperature obtained by the temperature sensor 88. Therefore, the decrease in flow velocity of the char flow can be determined without using the differential pressure gauge 86 as in the first embodiment. However, the decrease in flow velocity of the char flow may be determined also by use of the differential pressure gauge 86.

Then, the temperature sensor 88 is provided in the downstream end 82a of the branch tube 82, i.e., close to the char burner 126a to obtain the downstream end temperature, and hence reduction of a channel area due to sedimentation of powder can be determined over an entire region of the branch tube 82 on the upstream side of the position where the temperature sensor 88 is installed. Consequently, the decrease in flow velocity of the char flow can be accurately determined.

Consequently, the decrease in flow velocity of the char flow can be reliably detected, and the conveyance defect generated due to the sedimentation of powder in the branch tube 82 can be grasped in advance.

Furthermore, the value is changed based on the drop in downstream end temperature obtained by the temperature sensor 88, and the dilution nitrogen flow rate is increased. The flow velocity of the char flow can recover from the decrease, and the char can be inhibited from being sedimented in the branch tube 82.

Consequently, it is possible to recover from the decrease in flow velocity of the char flow while continuously supplying the char from the char burner 126a into the furnace, before it is determined that the char stays in the branch tube 82 and the conveyance tube shut-off valve 89a and the burner inlet shut-off valve 89b are fully closed to stop the char supply to the char burner 126a. Consequently, the flow of the powder fuel including the char can keep blocking, like the curtain, the radiation from inside the gasification furnace, and hence the wear on the tip of the char burner 126a inside the gasification furnace can be suppressed.

Note that the decrease in flow velocity of the char flow is determined by checking fluctuation in temperature measured with the temperature sensor 88 over elapsed time, but may be determined based on a differential value of the temperature measured with the temperature sensor 88 over time.

Figure 8:
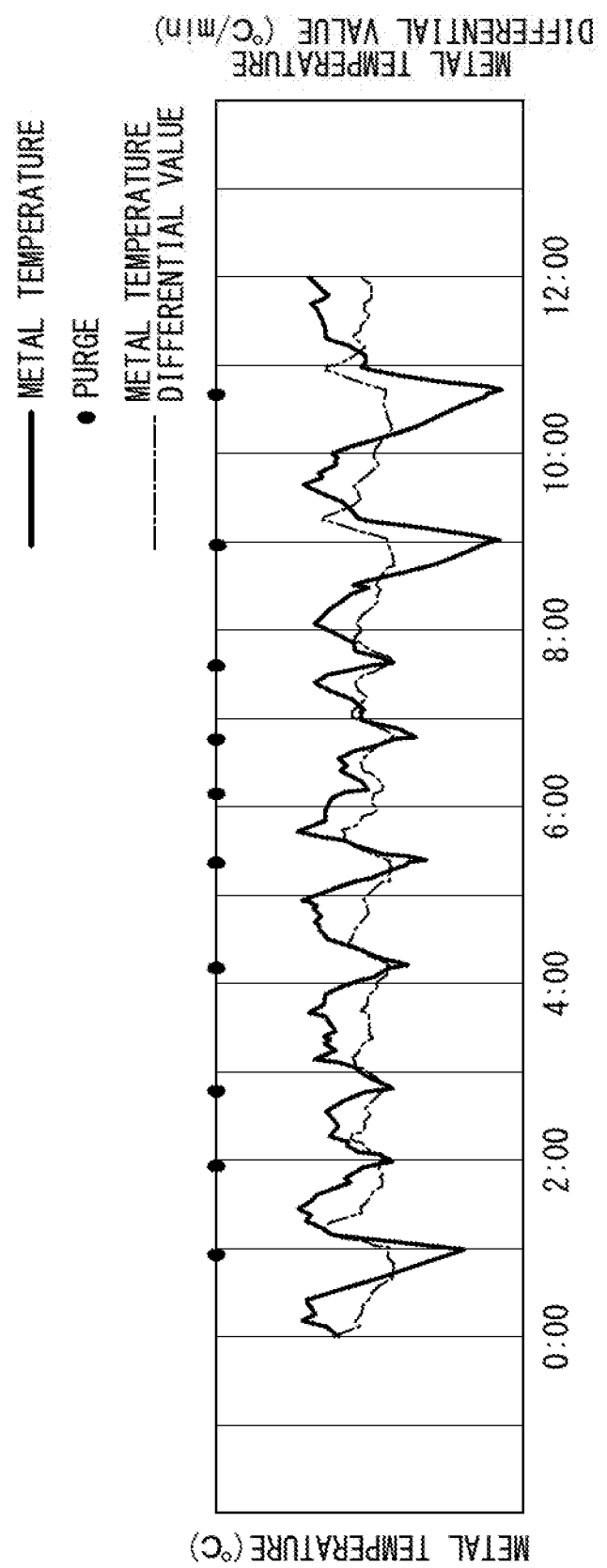
FIG. 8 is a graph showing a differential value of the metal temperature of FIG. 6.

FIG. 8 shows a differential value of the metal temperature of FIG. 6 with a one-dot chain line. As seen from the drawing, the differential value of the metal temperature has already been low since time 0:00. In a case where this low differential value continues for a predetermined time (e.g., 15 minutes), the decrease in flow velocity of the char flow is determined. Consequently, the decrease in flow velocity of the char flow can be determined earlier than in a case where the decrease is determined based on a change amount of the metal temperature (determined after elapse of 30 minutes).

Figure 9:
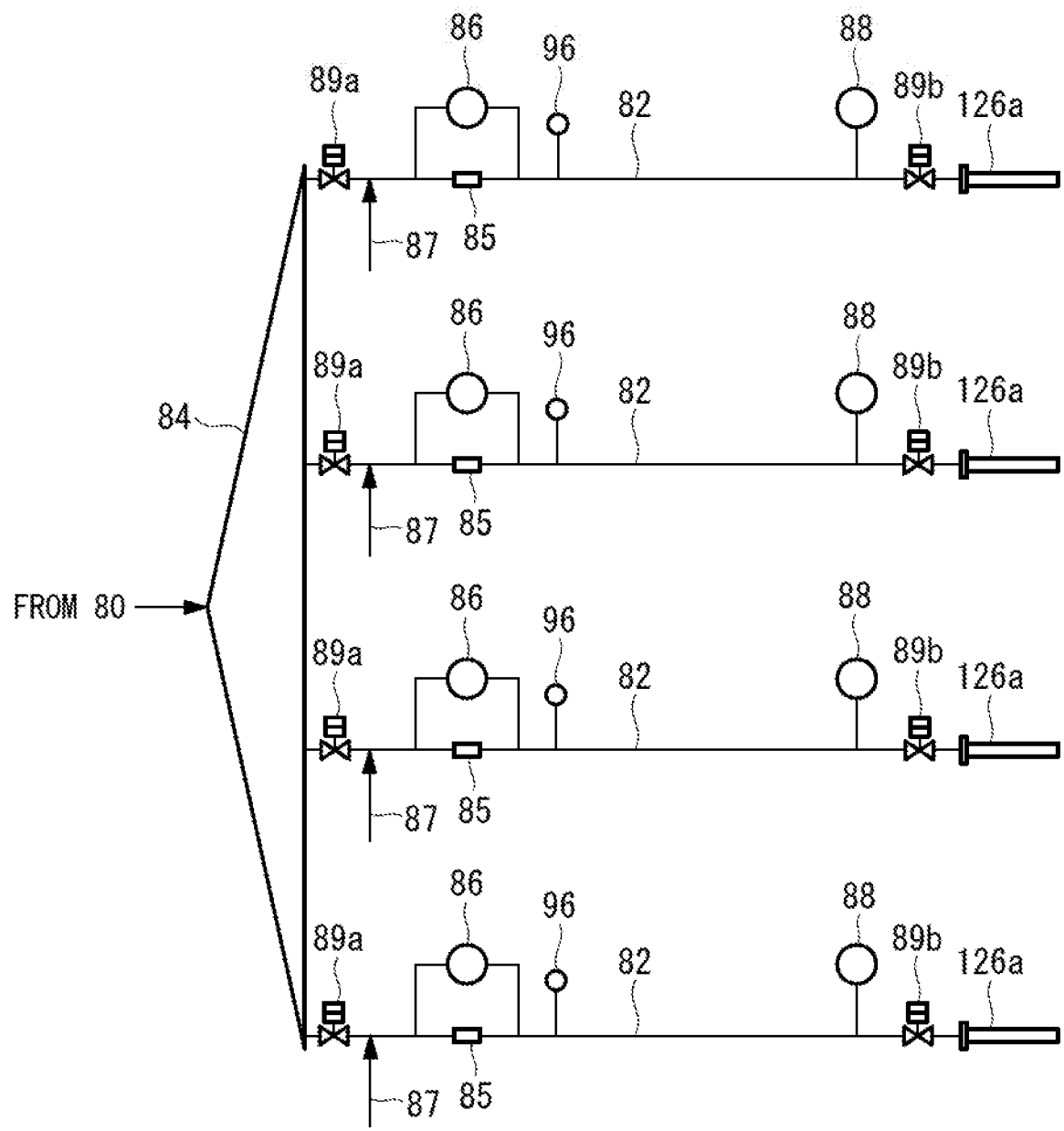
FIG. 9 is a schematic configuration diagram in which a γ-ray densimeter is disposed in the branch tube of FIG. 3.

Alternatively, as shown in FIG. 9, in addition to the above described first and second embodiments, a γ-ray densimeter (a powder fuel density measuring unit) 96 that measures a density of the char may be provided for each branch tube 82. In the γ-ray densimeter, the measured density is multiplied by the flow velocity of the char flow to calculate a flow rate of the char flow. Consequently, a mass flow rate of the char flow can be obtained, and the decrease in flow velocity of the char flow can be more accurately determined.

Furthermore, in the respective embodiments described above, the char supply system has been described, but the present invention may be for use in a system that supplies pulverized coal, or the present invention may be for use in another system that supplies powder fuel.

EXPLANATION OF REFERENCE

10: integrated coal gasification combined cycle (integrated gasification combined cycle)
11: coal supply unit
11a: coal supply line
14: gasifier unit
15: char recovery unit
16: gas clean-up unit
17: gas turbine
18: steam turbine
19: generator
20: heat recovery steam generator
41: compressed air supply line
42: air separation unit
43: first nitrogen supply line
45: second nitrogen supply line
46: char return line
47: oxygen supply line
49: gas generation line
51: dust collection unit
52: supply hopper
53: gas discharge line
61: compressor
62: combustor
63: turbine
64: rotary shaft
65: compressed air supply line
66: fuel gas supply line
67: combustion gas supply line
68: booster
69: turbine
70: flue gas line
71: steam supply line
72: steam recovery line
74: gas purification unit
75: stack
80: burner joiner
82: branch tube
84: burner distributor (a distributor)
85: flow nozzle (a resistor)
86: differential pressure gauge (a pressure loss measuring unit)
87: purge nitrogen supply pipe
88: temperature sensor (a temperature measuring unit)
89a: conveyance tube shut-off valve
89b: burner inlet shut-off valve
90: char joining pipe
91: mixing chamber
92: char supply flow control valve
93: dilution nitrogen supply pipe (an inert gas additional supply unit)
94: dilution nitrogen flow control valve
95: cooling coil
96: γ-ray densimeter (a powder fuel density measuring unit)
101: gasification furnace
102: syngas cooler
110: pressure vessel
111: gasification furnace wall
115: annulus part
116: combustor part
117: diffusor part
118: reductor part
121: gas discharge port
122: slag bath
126: burner
126a: char burner
127: burner
131: evaporator
132: superheater
134: economizer
154: internal space
156: external space

The invention claimed is:

1. A powder fuel supply apparatus comprising:
a distributor that branches supplied powder fuel to a plurality of branch tubes,
a plurality of burners connected to downstream ends of the plurality of branch tubes, respectively, to supply the powder fuel into a gasification furnace that gasifies the powder fuel,
a flow nozzle provided in each of the plurality of branch tubes, to apply pressure loss to powder fuel flow in the branch tube, and to equally distribute a flow rate of the powder fuel flowing through each of the branch tubes,
a pressure loss measuring unit for measuring a differential pressure generated by the flow nozzle,
a control unit configured to determine decrease in flow velocity of the powder fuel based on the differential pressure,
an inert gas additional supply unit for additionally supplying an inert gas to powder fuel flow of pulverized fuel flowing together with the inert gas toward the distributor, and
the control unit is configured to increase a flow rate of the inert gas to be additionally supplied from the inert gas additional supply unit in a case where decrease in flow velocity of the powder fuel flowing through the branch tube is determined based on the differential pressure.

2. A powder fuel supply apparatus comprising:
a distributor that branches supplied powder fuel to a plurality of branch tubes,
a plurality of burners connected to downstream ends of the plurality of branch tubes, respectively, to supply the powder fuel into a gasification furnace that gasifies the powder fuel,
a temperature measuring unit for measuring a downstream end temperature in the downstream end of each of the branch tubes,
a control unit that is configured to determine decrease in flow velocity of the powder fuel based on the downstream end temperature,
an inert gas additional supply unit for additionally supplying an inert gas to powder fuel flow of pulverized fuel flowing together with the inert gas toward the distributor, and
the control unit is configured to increase a flow rate of the inert gas to be additionally supplied from the inert gas additional supply unit in a case where decrease in flow velocity of the powder fuel flowing through at least one of the plurality of branch tubes is determined based on the downstream end temperature.

3. The powder fuel supply apparatus according to claim 1, wherein at least one of the plurality of branch tubes comprises a powder fuel density measuring unit for measuring a density of the powder fuel.

4. Gasifier unit comprising:
the powder fuel supply apparatus according to claim 1, and
the gasification furnace into which the powder fuel is supplied from the powder fuel supply apparatus.

5. Integrated gasification combined cycle comprising:
the gasifier unit according to claim 4,
a gas turbine that combusts at least a part of raw syngas obtained by the gasifier unit to rotate and drive,
a steam turbine that rotates and drives with steam generated by a heat recovery steam generator into which turbine flue gas discharged from the gas turbine is introduced, and
a generator rotatably coupled to the gas turbine and/or the steam turbine.

* * * * *